Sept. 21, 1965  C. H. LAMBERT  3,207,184

PIPE COUPLING

Filed Sept. 10, 1962

INVENTOR.
CLIFFORD H. LAMBERT
BY Williams, David,
Hoffmann & Yount
ATTORNEYS

United States Patent Office 3,207,184
Patented Sept. 21, 1965

3,207,184
PIPE COUPLING
Clifford H. Lambert, Brecksville, Ohio, assignor to The Eastern Company, Cleveland, Ohio, a corporation of Ohio
Filed Sept. 10, 1962, Ser. No. 222,354
3 Claims. (Cl. 138—89)

This invention relates to pipe couplings and, in particular, to a pipe coupling which includes a novel closure device or cover means and which is applicable to the end of a pipe member or of a pipeline for closing the flow passage and also for establishing controlled communication therewith.

It is often desirable to test the tightness of a pipeline or of a portion of a pipeline comprised of pipe members connected by couplings. The need for such testing may arise either during installation of a new pipeline or during repairing of an existing pipeline. In the case of a repair operation it may be desirable to close the flow passage at a certain point along the pipeline to permit pressurization thereof and, in the case of a new pipeline, it may be desirable to close the flow passage at the end of the last pipe member of the portion of the pipeline thus far installed. The need in either case is met to advantage and with facility by use of the novel coupling provided by this invention.

The present invention provides a novel pipe coupling comprising a tubular coupling member having openings at its opposite ends of a size to receive pipe members to be coupled, sealing means at such opposite ends subject to a clamping action by an associated clamping means, and cover means retained in a closing relation to one of the end openings by such clamping means.

Figure 1:
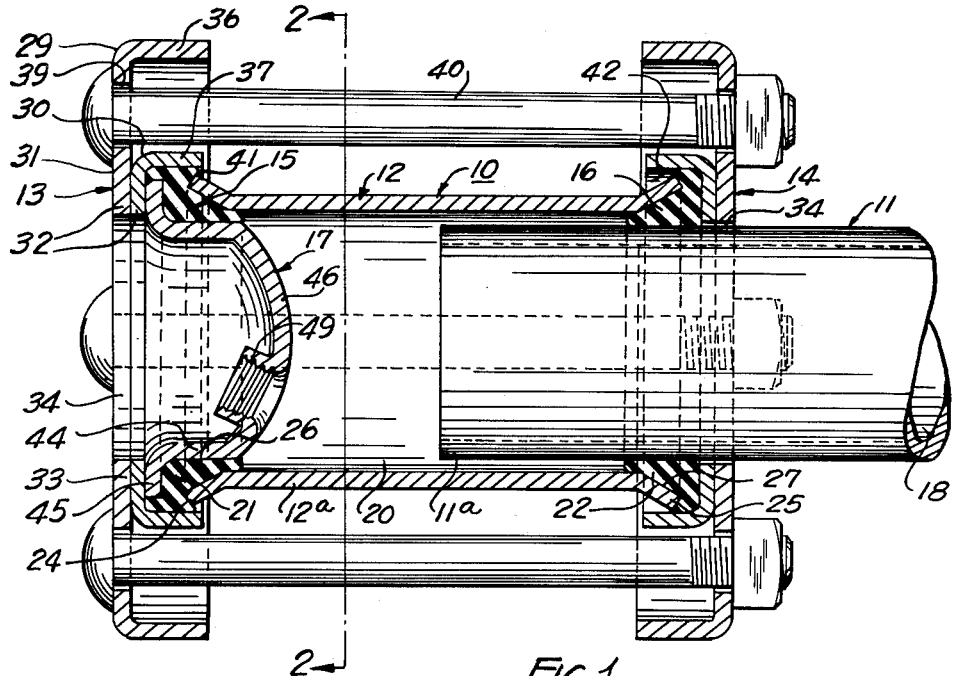
Figure 2:
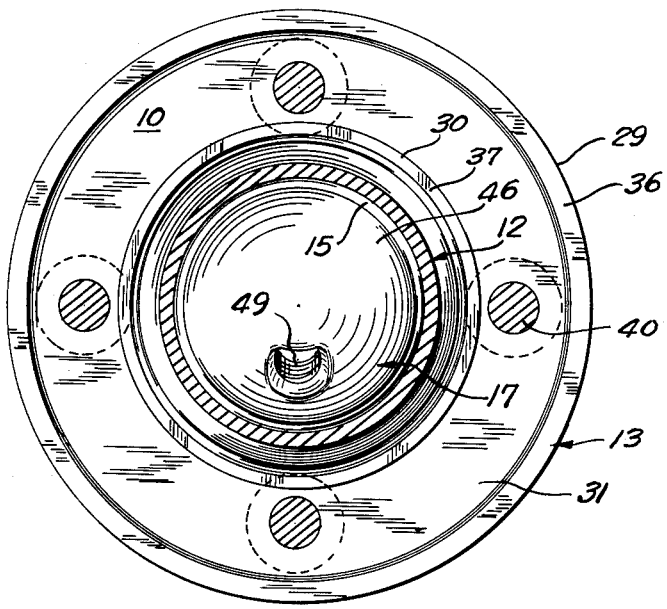

Other objects, novel characteristics and advantages of this invention will be apparent in the following detailed description and in the accompanying drawings forming a part of this specification and in which, FIG. 1 is a longitudinal section taken through the novel coupling and showing the same applied to one end of a pipe member for closing the flow passage thereof; and FIG. 2 is a transverse section taken through the coupling on section line 2—2 of FIG. 1.

As one embodiment of this invention the accompanying drawing shows the novel pipe coupling 10 applied to the end portion 11ᵃ of a pipe member 11. The coupling 10 comprises, in general, a sleeve member 12 and clamping members 13 and 14 at opposite ends of the sleeve member and having co-operative engagement with associated packing rings 15 and 16. The coupling 10 also comprises a closure or cover member 17 retained in place by one of the clamping members, in this case by the clamping member 13, for closing the flow passage 18 of the pipe member 11.

The sleeve member 12 is here shown as having a cylindrical body portion 12ᵃ of a suitable length and providing a straight longitudinal passage 20 which includes end openings 21 and 22 at opposite ends thereof. The sleeve member 12 is also provided at opposite ends thereof with outwardly flared ends or annular bevel portions 24 and 25 providing axially inwardly conveying annular seats 26 and 27 in surrounding relation to the end openings 21 and 22 and against which the packing rings 15 and 16 are adapted to be sealingly pressed by the clamping members 13 and 14.

The clamping members 13 and 14 are shown as being of identical construction and each comprises a pair of connected peripherally flanged ring members 29 and 30. The ring members 29 and 30 have flat end walls 31 and 32 which are secured together as by means of welds 33 and also have a common central access opening 34 extending through such end walls and located opposite the passage 20 of the sleeve member 12. The ring member 29 has an outer flange 36 extending around the coupling 10 axially thereof, and similarly, the ring member 30 has an inner annular flange 37 extending in the same axial direction but spaced radially inward from the outer flange.

The end walls 31 of the clamping members 13 and 14 are provided with groups of circumferentially spaced holes 39 located inwardly of the peripheral flanges 36 and through which clamping bolts 40 extend for applying pressure to the clamping members for drawing the latter into pressure engagement with the packing rings 15 and 16. The axial flanges 37 of the ring members 30 are of a diameter to surround the bevel portions 24 and 25 of the sleeve member 12 with small annular clearance spaces 41 and 42 therebetween. The ring members 30 thus serve as confining members for the packing rings 15 and 16.

The pipe member 11 extends into the coupling 10 from one end thereof, in this case through the end opening 16 of the sleeve member 12 and through the access opening 34 of the clamping member 14. The pipe member 11 can be a portion of a pipeline which is being repaired or can be the last length of pipe of a new pipeline being constructed. The packing ring 16 surrounds and embraces the pipe member 11 and is pressed into sealing engagement with the outer surface thereof by the compressive force of the clamping member 14 and by the resulting wedging action of the inwardly convegently inclined annular seat 27.

The cover or closure member 17 is derby-shaped and located at the end of the sleeve member 12 opposite that into which the pipe member 11 extends. The cover member 17 is here shown as comprising an annular ring portion or cylindrical section 44, an external flange portion or section 45, and a bowed or dome-shaped transverse wall portion or section 46. The ring portion 44 and the bowed transverse wall portion 46 together form a central axial bulge projection located in a substantially coaxial relation with the passage 20 of the sleeve member 12 when the cover member is held in its assembled position by the clamping member 13. The cover member 17 can be produced as a one-piece member formed from sheet metal or metal plate by a suitable forming operation.

The annular surfaces of the ring and flange portions 44 and 45 of the cover member 17 form annular seats for the packing ring 15 and apply thrust to the latter when the clamping bolts 40 are tightened. The packing ring 15 extends in a surrounding relation to and embraces the ring portion 44 and, if desired, can be assembled on the cover member 17 prior to the placing of the latter against the associated end of the sleeve member 12 during the assembling of the coupling 10.

When the coupling 10 is in its fully assembled condition as shown in FIG. 1 of the drawings, the cover member 17 closes the passage 20 of the sleeve member 12 and the flow passage 18 of the pipe member 11 so that fluid supplied to the flow passage can be subjected to pressure for testing the tightness of the pipeline and of the couplings assembled thereon. Communication with the flow passage 18 is provided by a threaded nipple 49 formed on the cover member 17 and preferably located on the bowed transverse wall 46 thereof. The passage of the nipple 49 can be closed as by means of a pipe plug (not shown) or, if desired, a conduit or flow control valve can be connected with the nipple for supplying or controlling the delivery of pressure fluid into or out of the passage 18 of the pipe member 11.

When the pipeline of which the pipe member 11 forms a part has been tested and an additional pipe member is to be coupled to the pipe member 11, the clamping bolts 40 are loosened to release the clamping member 13 whereupon the cover member 17 can be removed. The additional pipe member is then inserted into the sleeve member 12 through the end opening 21 thereof and through the access opening 34 of the clamping member 13. The packing ring 15 is applied to the end portion of the additional pipe member prior to such insertion into the sleeve member 12. When the clamping bolts 40 are retightened, the packing ring 15 will be pressed into sealing engagement with the outer periphery of the additional pipe members. It will be understood, of course, that, if desired, the cover member 17 can be left permanently in place and with the passage of the nipple 40 closed or controlled as explained above.

From the accompanying drawing and the foregoing detailed description it will now be readily understood that this invention provides an novel pipe coupling which can be used to advantage and with facility for closing the flow passage of a pipe member or of a pipeline for testing the tightness thereof or for other purposes. It will also be recognized that the novel coupling is usable in a conventional manner for connecting pipe members by the mere omission or removal of the cover member of the device.

Although the novel pipe coupling of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. As an article of commerce a device for closing one end of a pipe coupling having one end of a piece of pipe inserted in the other end, said coupling including a tubular member having outwardly flared ends, annular clamp members at opposite ends of said tubular member, each of said clamp members having an inwardly projecting radial flange spaced axially from the ends of said tubular member adjacent thereto and an axial extending flange, said axial extending flanges facing one another to provide with said radial flanges internal annular recesses into which the adjacent ends of said tubular member extend, sealing means located in said annular recesses and having portions extending into the adjacent ends of said tubular member, and means for drawing said clamp members toward one another and the adjacent ends of said tubular member, said article comprising: a one-piece derby-shaped cover member having a cylindrical section; an external flange section at one end of said cylindrical section adapted to be interposed in one of the clamp members between the radial flange thereof and the sealing means therein; and a dome-shaped section at the end of said cylindrical section opposite to said external flange section.

2. In a pipe coupling adapted to have adjacent ends of adjoining lengths of pipe inserted therein having a tubular member having outwardly flared ends, annular clamp members at opposite ends of said tubular member, each of said clamp members having an inwardly projecting radial flange spaced axially from the ends of said members tubular member adjacent thereto and an axially extending flange, said axially extending flanges facing one another to provide with said radial flanges internal annular recesses into which the adjacent ends of said tubular member extend, sealing means located in said annular recesses and having portions extending into the adjacent flared ends of said tubular member, and means for drawing said clamp members toward one another and the adjacent ends of said tubular member, a device for temporarily closing one end of said coupling comprising: a derby-shaped cover member having a cylindrical section; an external flange on one end of said cylindrical section adapted to be interposed in one of said clamp members between the radial flange thereof and the sealing means therein; and means closing the end of said cylindrical section opposite to said external flange of said derby-shaped member.

3. In a pipe coupling adapted to have adjacent ends of adjoining lengths of pipe inserted therein having a tubular member having outwardly flared ends, annular clamp members at opposite ends of said tubular member each of said clamp members having an inwardly projecting radial flange spaced axially from the ends of said tubular member adjacent thereto and an axially extending flange, said axially extending flanges facing one another to provide with said radial flanges internal annular recesses into which the adjacent ends of said tubular member extend, sealing means located in said annular recesses and having portions extending into the adjacent flared ends of said tubular member, and means for drawing said clamp members toward one another and the adjacent ends of said tubular member, a device for temporarily closing one end of said coupling comprising: a cover member having an annular ring portion; an external flange on one end of said annular ring portion adapted to be interposed in one of the clamp members between the flange thereof and the sealing means therein; and a bowed transverse wall portion at the end of said annular ring portion opposite to said external flange said transverse wall portion being bowed outwardly in the direction away from said external flange.

References Cited by the Examiner
UNITED STATES PATENTS

| | | | |
|---|---|---|---|
| 442,947 | 12/90 | Bowers | 285—363 X |
| 1,855,494 | 4/32 | Sorensen | 285—177 X |
| 1,933,117 | 10/33 | Markle | 138—89 |
| 2,288,904 | 7/42 | Hudson | 285—337 X |
| 3,036,601 | 5/62 | Fabian et al. | 138—89 |

LEWIS J. LENNY, *Primary Examiner.*

EDWARD V. BENHAM, *Examiner.*

UNITED STATES PATENT OFFICE
CERTIFICATE OF CORRECTION

Patent No. 3,207,184 September 21, 1965

Clifford H. Lambert

It is hereby certified that error appears in the above numbered patent requiring correction and that the said Letters Patent should read as corrected below.

In the grant, lines 2 and 3, for "assignor to The Eastern Company, of Cleveland, Ohio, a corporation of Ohio" read -- assignor to The Eastern Company, of Cleveland, Ohio, a corporation of Connecticut --; in the heading to the printed specification, lines 3 to 5, for "assignor to The Eastern Company, Cleveland, Ohio, a corporation of Ohio" read -- assignor to The Eastern Company, Cleveland, Ohio, a corporation of Connecticut --.

Signed and sealed this 17th day of May 1966.

(SEAL)
Attest:

ERNEST W. SWIDER
Attesting Officer

EDWARD J. BRENNER
Commissioner of Patents